United States Patent [19]

Yasukochi et al.

[11] Patent Number: 4,482,416
[45] Date of Patent: Nov. 13, 1984

[54] METHOD OF FOLDING ANNULAR BAND

[75] Inventors: Takashi Yasukochi, Tokorozawa; Yoshihiro Fukamachi, Higashimurayama, both of Japan

[73] Assignee: Bridgestone Tire Company Limited, Tokyo, Japan

[21] Appl. No.: 410,834

[22] Filed: Aug. 23, 1982

[30] Foreign Application Priority Data

Aug. 24, 1981 [JP] Japan .................. 56-132314

[51] Int. Cl.$^3$ .......................................... B29H 17/00
[52] U.S. Cl. .................... 156/133; 156/201; 156/204; 156/215; 156/218; 156/222; 156/226; 156/420; 156/421.4; 264/315
[58] Field of Search .............. 156/133, 134, 218, 222, 156/123, 126, 132, 212, 200, 215, 201, 204, 226, 156/227, 394.1, 401, 414, 417, 420, 443, 469, 421.4; 152/361 FP; 264/314, 315; 493/457

[56] References Cited

U.S. PATENT DOCUMENTS

| | | | |
|---|---|---|---|
| 3,154,455 | 10/1964 | Nebout | 156/133 X |
| 3,160,545 | 12/1964 | Burton | 156/415 |
| 3,438,832 | 4/1969 | Cantarutti | 156/132 X |
| 3,525,655 | 8/1970 | Wood et al. | 156/133 X |
| 3,647,598 | 3/1972 | Gazuit | 156/415 |
| 3,740,293 | 6/1973 | Jones et al. | 156/132 X |
| 3,784,437 | 1/1974 | Appleby et al. | 156/132 X |
| 4,063,987 | 12/1977 | Irie et al. | 156/133 X |
| 4,087,306 | 5/1978 | Head et al. | 156/132 X |

FOREIGN PATENT DOCUMENTS

114556  9/1980  Japan .

Primary Examiner—William A. Powell
Assistant Examiner—Thomas Bokan

[57] ABSTRACT

For folding an annular resilient band about a circumferential fold line, the band is first wrapped on a generally cylindrical, radially collapsible drum structure having a cylindrical external contour about the center axis of the drum and an annular zone radially inward of the contour with an inflatable annular first bladder positioned in such a manner as to have a folded-over axial end portion axially protruding into the aforesaid annular zone and with an inflatable annular second bladder positioned radially inwardly of the first bladder and in such a manner that the first and second bladders have axial portions overlapping each other, whereupon the first bladder is inflated to a medium expanded state so that an axial end portion of the band on the drum structure is contacted by the bladder and displaced radially outwardly and thereafter the first bladder is moved axially away from the drum structure for forming an annular gap between the first bladder and the axial end portion of the band, the second bladder being thereafter inflated to a fully expanded state for deforming the first bladder axially between the band and the second bladder so that the axial end portion of the band is caused to further turn about the aforesaid fold line until the axial end portion of the band is received on an adjacent axial portion of the band.

2 Claims, 4 Drawing Figures

METHOD OF FOLDING ANNULAR BAND

FIELD OF THE INVENTION

The present invention relates to a method of folding an annular band such as a breaker band to form part of a tire carcass along a circumferential fold line and further to a band folding apparatus adapted to carry out such a method.

BACKGROUND OF THE INVENTION

A pneumatic radial tire has a tire carcass including a breaker band having opposite axial end portions turned back onto the outer peripheral surface of adjacent axial portions of the band. Such a configuration of the breaker band is useful for avoiding application of concentrated loads to the axial end portions of the breaker band. A band folding apparatus operable to form such a breaker band is taught in, for example, in Japanese Provisional Patent Publication No. 55-114556. A breaker band folded by the use of the band folding apparatus therein shown has a drawback in that wrinkles and unusual stresses are inevitably produced in the turned-over portions of the band and deteriorate the performance quality of the tire using such a breaker band.

It is, accordingly, an important object of the present invention to provide a method of folding a breaker band or any annular resilient band along a circumferential fold line without producing wrinkles in the vicinity of the fold line.

It is another important object of the present invention to provide a band folding apparatus adapted to put such a method into practice.

SUMMARY OF THE INVENTION

In accordance with one outstanding aspect of the present invention, there is provided a method of folding an annular resilient band about a circumferential fold line, comprising the steps of wrapping the annular band on a generally cylindrical drum structure which has a center axis therethrough, a cylindrical external contour about the center axis and an annular zone radially inward of the cylindrical external contour, the drum structure being radially collapsible about the center axis thereof, the band being wrapped around the drum structure with an inflatable annular first bladder in such a manner as to have a folded-over axial end portion of the first bladder axially protruding into the above mentioned annular zone and with an inflatable annular second bladder positioned radially inwardly of the first bladder and in such a manner that the first and second bladders have axial portions overlapping each other, the band wrapped on the drum structure having an axial end portion axially protruding from an axial end of the drum structure, inflating the first bladder to a predetermined medium expanded state so that the axial end portion of the band on the drum structure is contacted by the bladder and displaced radially outwardly, moving the first bladder a predetermined distance axially away from the drum structure for forming an annular gap between the first bladder and the axial end portion of the band, and inflating the second bladder to a fully expanded state for deforming the first bladder axially between the band and the second bladder so that the axial end portion of the band is caused to further turn about the aforesaid fold line until the axial end portion of the band is received on an adjacent axial portion of the band. Preferably, the first bladder is inflated to an expanded state minor to aforesaid medium expanded state so as to have its outer peripheral surface substantially aligned with the cylindrical external contour of the drum structure. Furthermore, the first bladder may be moved away from the drum structure after the first bladder is inflated to the medium expanded state. As an alternative, the first bladder may be moved away from the drum structure while the first bladder is being inflated to the medium expanded state.

In accordance with another outstanding aspect of the present invention there is provided a band folding apparatus comprising a generally cylindrical drum structure which has a center axis therethrough, a cylindrical external contour about the center axis and an annular zone radially inward of the cylindrical external contour, the drum structure being radially collapsible about the center axis thereof, bladder carrier means positioned generally cylindrically about an axis substantially aligned with the center axis of the drum structure, at least one of the drum structure and the bladder carrier means being movable in its entirety axially toward and away from the other thereof, and inflatable annular first and second bladders supported on the bladder carrier means, the first bladder having a folded-over axial end portion axially protruding into the above mentioned annular zone and the second bladder having an axial portion surrounded by an axial portion of the first bladder, each of the first and second bladders being formed with an aperture communicable with a source of fluid under pressure, the folded-over axial end portion of the first bladder having a resistance to elongation less than the resistance to elongation of the opposite folded-over axial end portion of the first bladder. The band folding apparatus thus constructed and arranged basically may further comprise a drum shaft which has a center axis partially coincident with the center axis of the drum structure, the drum shaft being rotatable about the center axis thereof, the drum structure being coaxially supported on the drum shaft and being rotatable with the drum shaft about the center axis of the drum shaft. In this instance, the drum structure may comprise a plurality of hub segments rotatable with the drum shaft and circumferentially spaced apart from each other about the center axis of the drum shaft, the hub segments being movable radially toward and away from the drum shaft, drive means supported on the drum shaft and positioned radially inwardly of the hub segments, the drive means being operative to drive the hub segments radially toward and away from the drum shaft, and a plurality of deck segments respectively coupled to and extending radially away from the hub segments, the deck segments being movable together with the hub segments, respectively, and being circumferentially spaced apart from each other about the center axis of the drum shaft so that the drum structure as a whole has the cylindrical external contour described by the radially outer end faces of the deck segments, each of the deck segments having opposite axial end portions axially protruding in opposite directions and thereby forming the annular zone radially inwardly of the axial end portions of the deck segments along one axial end of the drum structure.

BRIEF DESCRIPTION OF THE DRAWINGS

The drawbacks of a prior-art band folding apparatus and the features and advantages of a method and an apparatus according to the present invention will be more clearly understood from the following description taken in conjunction with the accompanying drawings in which.

DESCRIPTION OF THE PRIOR ART

Figure 1:
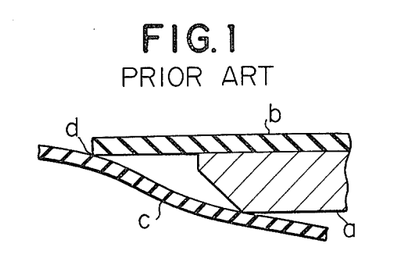
FIG. 1 is a fragmentary cross sectional view showing the arrangement in which a breaker band to be folded in a priorart band folding apparatus is wrapped around a drum structure of the apparatus.
Figure 2:
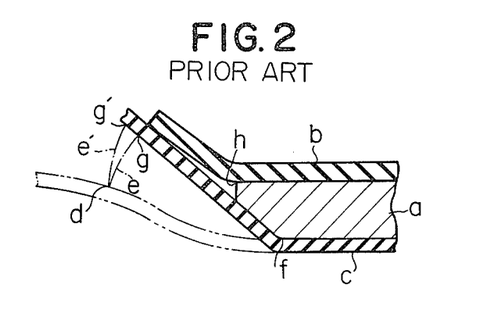
FIG. 2 is a view similar to FIG. 1 but shows the arrangement in which the breaker band wrapped around the drum structure is being folded with a bladder inflated partially.

Referring to FIG. 1 of the drawings, the band folding apparatus taught in Japanese Provisional Patent Publication No. 55-114556 comprises a radially collapsible, generally cylindrical drum structure including a plurality of deck segments a which are equiangularly spaced apart from each other about the center axis of the drum structure. An annular breaker band b to be folded by the prior-art apparatus is wrapped around such a drum structure and has opposite axial end portions protruding beyond the opposite axial ends, respectively, of the individual deck segments a. An annular inflatable bag or bladder c is positioned in part radially inwardly of the deck segments a and in part axially outwardly of the deck segments a. When the bladder c is maintained in a fully collapsed state, the annular breaker band b is contacted by the bladder c at a circumferential edge of the band b along line d on the bladder c. When the bladder c is inflated with fluid under pressure, the circumferential line d along which the breaker band b is contacted by the bladder c turns in an arc e about a radially inner edge f of each of the deck segments a so that the band b is contacted by the bladder c along line g on the bladder c as shown in FIG. 2.

As the bladder c is expanded, an axial end portion of the breaker band b is also deformed and, thus, the above mentioned circumferential edge thereof is caused to turn in an arc e' about a radially outer edge h of each of deck segments a. As a consequence, the axial end portion of the band b attempts to deform in such a manner as to be contacted by the bladder c along line g' on the bladder c. Because, in this instance, of the fact that both the breaker band b and the bladder c are formed of rubber, the breaker band b and the bladder c tend to stick together and are not permitted to freely slide on each other. For this reason, the axial end portion of the breaker band b actually remains contacted by the bladder c along the line g on the bladder c.

As a result of such restricted deformation of the breaker band b, wrinkles are produced in each of the opposite axial end portions of the breaker band b. The wrinkles thus produced in the breaker band b become more salient and give rise to creation of unusual stresses when the breaker band b is later folded about a line adjacent the radially outer edge h of each of the deck segments a. The present invention contemplates resolution of such a problem encountered in folding a breaker band or any annular resilient band along a circumferential fold line.

DESCRIPTION OF THE PREFERRED EMBODIMENT

Figure 3:
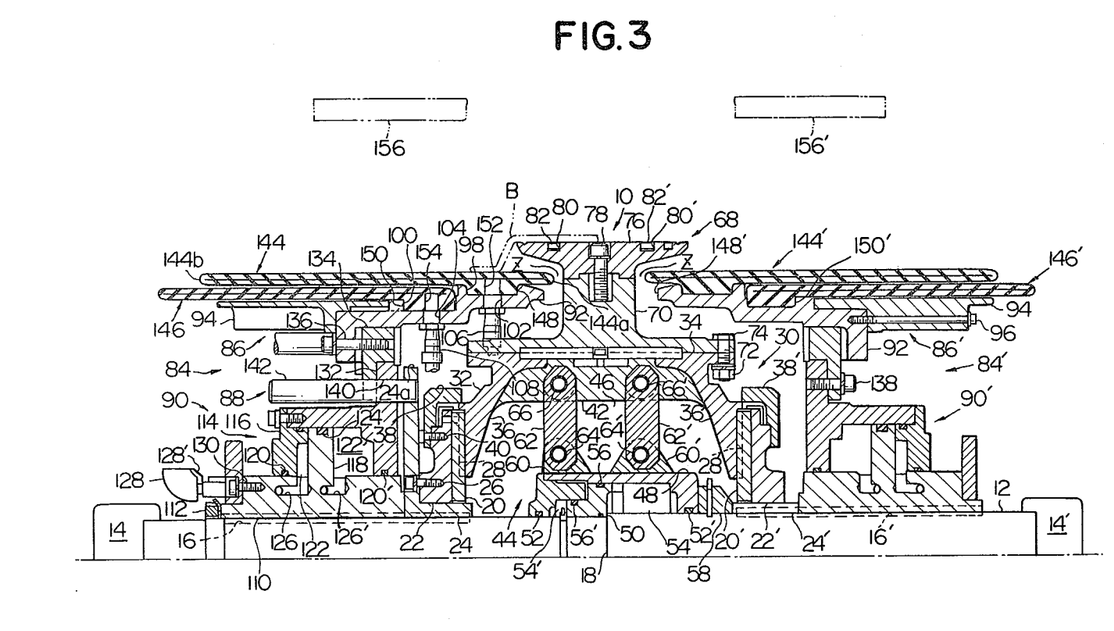
FIG. 3 is an axial sectional view showing a preferred embodiment of a band folding apparatus according to the present invention.

Referring to FIG. 3, a band folding apparatus embodying the present invention comprises a radially collapsible drum structure 10 rotatable about the center axis of a hollow drum shaft 12 axially extending between suitable support structures 14 and 14' and having opposite axial end portions respectively journaled in the support structures 14 and 14'. The drum shaft 12 is operatively connected at one end thereof to suitable drive means (not shown) and is rotatable about the center axis thereof. The drum shaft 12 has formed in its outer peripheral wall thereof a first set of key ways 16 equidistantly spaced apart from each other circumferentially of the shaft 12 and terminating in the vicinity of one axial end of the shaft 12 and a second set of key ways 16' also equidistantly spaced apart from each other circumferentially of the shaft 12 and terminating in the vicinity of the other axial end of the shaft 12. The first and second sets of key ways 16 and 16' are axially aligned with each other across an intermediate axial portion of the drum shaft 12. The drum shaft 12 is further formed with a circumferential groove 18 in the intermediate axial portion thereof.

The drum structure 10 of the band folding apparatus embodying the present invention comprises a pair of annular guide plates 20 and 20' which are spaced apart from each other axially of the drum shaft 12 and which are secured to guide support discs 22 and 22', respectively, which in turn are securely coupled to guide support sleeves 24 and 24', respectively, by suitable fastening means such as bolts 26 as shown in connection with the guide support sleeve 24. The guide support sleeves 24 and 24' are keyed to the drum shaft 12 respectively through the first set of key ways 16 and the second set of key ways 16' and are axially spaced apart from each other across the intermediate axial portion of the drum shaft 12. Each of the guide support sleeves 24 and 24' has an annular flange portion as indicated at 24a in connection with the sleeve 24. The guide plates 20 and 20' have radial grooves 28 and 28', respectively, formed in their axial end walls facing each other. The radial grooves 28 and 28' in each of the guide plates 20 and 20' extend radially away from the center axis of the drum shaft 12 and are equiangularly spaced apart from each other about the center axis of the shaft 12, though not shown in the drawings. Furthermore, the radial grooves 28 and 28' in one of the guide plates 20 and 20' are respectively aligned with the radial grooves 28 and 28' in the other of the guide plates 20 and 20' axially of the drum shaft 12.

The drum structure 10 of the band folding apparatus embodying the present invention further comprises a plurality of drum hub assemblies 30 which are coaxially rotatable with the above described hollow drum shaft 12 and which are disposed in symmetry with each other about the center axis of the drum shaft 12. Each of the drum hub assemblies 30 comprises a hub segment 32 axially intervening between the above described guide plates 20 and 20'. The hub segment 32 has a generally U-shaped cross section and is thus formed with a concavity which is open toward the outer peripheral surface of the intermediate axial portion of the drum shaft 12. The hub segment 32 further has an intermediate base portion 34 spaced apart radially outwardly from the outer peripheral surface of the drum shaft 12 and a pair of leg portions 36 and 36' projecting from the opposite axial ends of the base portion 34 toward the intermediate axial portion of the drum shaft 12 and spaced apart from each other axially of the shaft 12. The leg portions 36 and 36' of the hub segment 32 are respectively formed with projections elongated radially of the drum shaft 12 and slidably received in the radial grooves 28 and 28' in the guide plates 20 and 20', respectively. The individual hub segments 32 are equiangularly spaced apart from each other about the center axis of the drum shaft 12 and are movable radially inwardly and outwardly of the drum shaft 12, i.e., toward and away from the center, axis of the shaft 12. The guide support discs 22 and 22' have secured thereto stop members 38 and 38', respectively, by suitable fastening means such as bolts 40 as shown in connection with the stop member 38. When the hub segment 32 is moved radially away from the drum shaft 12, the stop members 38 and 38' are brought into abutting engagement with the leg portions 36 and 36', respectively, of the hub segment 32 and prevent the hub segment 32 from being moved beyond a predetermined radial position spaced apart from the drum shaft 12. The hub segment 32 further has a projection 42 projecting toward of the drum shaft 12 as shown.

The drum structure 10 further comprises drive means positioned radially inwardly of the hub segments 32 and axially intermediate between the guide plates 20 and 20' and adapted to drive the individual hub segments 32 radially toward and away from the intermediate axial portion of the drum shaft 12. In the embodiment herein shown, such drive means is common to the individual drum hub assemblies 30 and comprises a fluid-operated main power cylinder unit 44 and a parallel crank four-bar linkage mechanism 46. The main power cylinder unit 44 comprises a hollow movable cylinder body 48 coaxially rotatable with and axially movable on the intermediate axial portion of the drum shaft 12, and a ring-shaped stationary piston 50 securely and coaxially fitted to the drum shaft 12 through the previously described circumferential groove 18 formed in the intermediate axial portion of the drum shaft 12. The cylinder body 48 has an inner peripheral surface defining a cylindrical cavity around the intermediate axial portion of the drum shaft 12 and has the piston 50 enclosed therewithin. The cavity in the cylinder body 48 is hermetically sealed off by means of annular sealing elements 52 and 52' respectively fitted in circumferential grooves in the end walls of the cylinder body 48. The cylinder body 48 has its inner peripheral surface held in slidable contact with the outer peripheral surface of the piston 50, forming in the cylinder body 48 first and second fluid chambers 54 and 54' which are separate from each other across the piston 50. The first and second fluid chambers 54 and 54' are hermetically isolated from each other by means of annular sealing elements 56 and 56' which are respectively fitted in circumferential grooves formed in outer peripheral wall portions of the piston 50. Though not shown in the drawings, the fluid chambers 54 and 54' are communicable with a source of fluid under pressure such as an air compressor through suitable passageway means having fluid distributor valve means incorporated therein. The cylinder body 48 is thus axially movable on the drum shaft 12 in either direction with respect to the piston 50 when fluid under pressure is directed into one of the fluid chambers 54 and 54' with the other fluid chamber made open to the atmosphere. The drum shaft 12 has fixedly mounted thereon a stop member 58 which is adapted to prevent the cylinder body 48 from being moved beyond a predetermined axial position with respect to the drum shaft 12 when the cylinder body 48 is caused to axially move toward, for example, the guide plate 20'.

On the other hand, the parallel crank four-bar linkage mechanism 46 of the above mentioned drive means comprises a pair of bracket members 60 and 60' projecting from the outer peripheral surface of the cylinder body 48, and a pair of link members 62 and 62' which are pivotally connected each at one end thereof to the bracket members 60 and 60', by means of pivot pins 64 and 64', respectively. The link members 62 and 62' have equal lengths and are further pivotally connected at the other ends thereof to the projection 42 of the base portion 34 of each of the hub segments 32 by means of pivot pins 66 and 66', respectively. The line segment joining the pivot pins 64 and 64' on the bracket members 60 and 60' is equal to and parallel with the line segment joining the pivot pins 66 and 66' on the hub segment 32 and, furthermore, the line segment joining the pivot pins 64 and 66 on the link member 62 is equal to and parallel with the line segment joining the pivot pins 64' and 66' on the link member 62'. When the cylinder body 48 of the main power cylinder unit 44 is caused to axially move in either direction on the drum shaft 12 as above described, the link members 62 and 62' are caused to turn in either direction about the center axes of the pivot pins 64 and 64' on the cylinder body 48. The link members 62 and 62' are thus caused to turn also about the center axes of the pivot pins 66 and 66' on the hub segment 32 and thereby drive the hub segment 32 to move radially toward or away from the intermediate axial portion of the drum shaft 12 with the leg portions 36 and 36' thereof being guided through the radial grooves 28 and 28' in the guide plates 20 and 20', respectively. In the arrangement herein shown, it is assumed by way of example that the link members 62 and 62' of the individual drum hub assemblies 30 thus constructed and arrangement are held in positions extending at right angles to the center axis of the drum shaft 12 when the cylinder body 48 is held in the previously mentioned axial position engaged by the stop member 58 on the drum shaft 12 as shown in FIG. 3.

The drum structure 10 of the band folding apparatus embodying the present invention further comprises a plurality of drum deck assemblies 68 each of which is coaxially rotatable with the drum shaft 12 and the above described hub segment 32 and movable together with the hub segment 32 radially toward and away from the intermediate axial portion of the drum shaft 12. Each of the drum deck assemblies 68 comprises a coupling 70 having a pair of axially extending leg portions secured to the leg portions 36 and 36', respectively, of the hub segment 32 by suitable fastening means such as a bolt 74 and a nut 72 as shown, and a deck segment 76 secured to the coupling member 70 by means of a bolt 78 screwed through the deck segment 76 into the coupling member 70. The deck segment 76 has formed in its radially outer wall portion a recess having the head of the bolt 78 enclosed therein. The deck segments 76 each shaped as above described are equiangularly spaced apart from each other about the center axis of the drum shaft 12 so that the drum structure 10 as a whole has a generally cylindrical external contour described by the radially outer end faces of the individual deck segments 76. The diameter of the cylindrical external contour, viz., the outside diameter of the drum structure 10 is given by the distance between the center axis of the drum shaft 12 and the radially outer face of each of the deck segments 76. The outside diameter of the drum structure 10 is, thus, continuously variable as the drum deck assemblies 68 having the coupling members 70 and deck segments 76 are radially moved together with the hub segments 32 of the above described drum hub assembly 30 toward or away from the center axis of the drum shaft 12. Each of the deck segments 76 further has opposite axial end portions axially protruding in opposite directions and accordingly has a generally T-shaped cross section as shown. The drum structure 10 as a whole thus has annular zones Z radially inward of the above mentioned cylindrical external contour thereof or, more specifically, of the axial end portions of the deck segments 76 along the opposite axial ends of the drum structure 10. Each of the deck segments 76 has further formed in its radially outer wall portion grooves 80 and 80' extending in circumferential directions of the drum deck assemblies 68. Endless garter belts 82 and 82' of a resilient material such as rubber is received in the grooves 80 and 80' in the individual deck segments 76 so that the drum deck assemblies 68 and accordingly the respective hub segments 32 of the drum hub assembly 30 are urged radially inwardly toward the center axis of the drum shaft 12. In the embodiment of the present invention as herein shown, it is assumed by way of example that the drum structure 10 thus variable in outside diameter is caused to fully expand about the center axis of the drum shaft 12 when the cylinder body 48 of the main power cylinder unit 44 is held in the previously mentioned predetermined axial position engaged by the stop member 58 on the drum shaft 12. Thus, the drum structure 10 is held in a fully expanded condition about the center axis of the drum shaft 12 in the presence of a fluid pressure developed in the first fluid chamber 54 of the power cylinder unit 44 with the second fluid chamber 54' of the unit 44 kept open to the atmosphere.

The band folding apparatus embodying the present invention further comprises a pair of bladder support mechanisms 84 and 84' adapted to carry bladders thereon on both sides of the drum structure 10 and to move the bladders toward and away from the drum structure 10 in directions parallel with the drum shaft 12. In the embodiment herein shown, the bladder support mechanisms 84 and 84' respectively comprise bladder carrier means 86 and 86' adapted to have bladders carried thereon and movable in directions parallel with the drum shaft 12, guide means 88 adapted to guide the bladder carrier means 86 and 86' to move along the drum shaft 12, and drive means 90 and 90' adapted to drive the carrier means 86 and 86' for movement along the drum shaft 12. Since the carrier means 86, guide means 88 and drive means 90 of the bladder support mechanism 84 are similar in construction and arranged symmetrically to the carrier means 86', guide means and drive means 90', respectively, of the bladder support mechanism 84', description will be herein made regarding the construction and arrangement of only the means 86, 88 and 90 of the bladder support mechanism 84.

The bladder carrier means 86 of the bladder support mechanism 84 comprises generally cylindrical first and second bladder carrying members 92 and 94 coaxially surrounding the above described drive means 90 about the center axis of the drum shaft 12. The first and second bladder carrying members 92 and 94 have portions axially overlapping each other and are securely coupled together by suitable fastening means such as a bolt as shown at 96 in connection with the bladder carrier means 86' of the bladder support mechanism 84'. The bladder carrying members 92 and 94 may thus be constituted by a unitary member if desired. The first bladder carrying member 92 is formed with first and second circumferential grooves 98 and 100 which are open radially outwardly of the carrying member 92. The outer peripheral surface defining the bottom of the first circumferential groove 98 is slightly larger in diameter than the outer peripheral surface defining the bottom of the second circumferential groove 100. The first bladder carrying member 92 is further formed with first and second apertures 102 and 104 which are open to these circumferential grooves 98 and 100, respectively. First and second fluid inlet/outlet fittings 106 and 108 are connected to the bladder carrying member 92 and are open to these apertures 102 and 104, respectively. Though not shown in the drawings, these fittings 106 and 108 are communicable a source of fluid under pressure such as an air compressor through conduits across suitable fluid distributor valve means.

On the other hand, the drive means 90 comprises a cylindrical sleeve 110 keyed to the drum shaft 12 through the key ways 16 in the drum shaft 12. The sleeve 110 has an annular outer flange portion and is axially held in position by means of a ring-shaped retainer element 112 secured to the drum shaft 12. The drive means 90 further comprises a fluid-operated auxiliary power cylinder unit 114 comprising a hollow movable cylinder body 116 coaxially rotatable with and axially movable on the outer peripheral surface of the sleeve 110, and an annular stationary piston 118 constituted by the above mentioned outer flange portion of the sleeve 110. The cylinder body 116 has an inner peripheral surface defining around the sleeve 110 a cylindrical cavity which is hermetically sealed off by means of annular sealing elements 120 and 120' respectively fitted in circumferential grooves in the end walls of the cylinder body 116. The cylinder body 116 has its inner peripheral surface held in slidable contact with the outer peripheral surface of the piston 118, forming in the cylinder body 116 first and second fluid chambers 122 and 122' which are separate from each other across the piston 118. The first and second fluid chambers 122 and 122' are hermetically isolated from each other by means of an annular sealing element 124 fitted in a circumferential groove formed in an outer peripheral wall portion of the piston 118. Though not shown in the drawings, the fluid chambers 122 and 122' are communicable with a source of fluid under pressure such as an air compressor through fluid passageways 126 and 126' formed in the sleeve 110 and via fittings 128 and 128' secured to the sleeve 110 by suitable fastening means such as bolts 130 only one of which is shown in FIG. 3. The fittings 128 and 128' are open each at one end thereof to the fluid passageways 126 and 126', respectively, and at the other ends thereof to suitable conduits leading from a source of fluid under pressure such as an air compressor across suitable fluid distributor valve means, though not shown in the drawings. The cylinder body 116 is thus axially movable on the sleeve 110 in either direction with respect to the stationary piston 118 when fluid under pressure is directed into one of the fluid chambers 122 and 122' with the other fluid chamber made open to the atmosphere. The cylinder body 116 has an annular flange portion 132 securely connected to the above mentioned first and second bladder carrying members 92 and 94 by suitable fastening means such as a ring-shaped coupling member 134 secured to the flange portion 132 of the cylinder body 116 and a plurality of bolts 136 securing the coupling member 134 to the first bladder carrying member 92. The coupling member 134 is secured to the flange portion 132 of the cylinder body 116 by means of a plurality of bolts one of which is shown at 138 in connection with the bladder support mechanism 84'.

The flange portion 132 of the cylinder body 116 is formed with a plurality of apertures 140 which are arranged circumferentially of the cylinder body 116. A plurality of elongated guide rods one of which is shown at 142 axially project from the flange portion 24a of the guide support sleeve 24 and slidably extend in parallel with the drum shaft 12 respectively through the apertures 140 in the annular flange portion 132 of the cylinder body 116. Thus, the first and second bladder carrying members 92 and 94 are movable with the cylinder body 116 in opposite directions parallel with the drum shaft 12 under the guidance of the guide rods 142 thus arranged. The guide rods 142 and the associated portions of the guide support sleeve 24, cylinder body 116 and coupling member 134 constitute the previously mentioned guide means 88 of the bladder support mechanism 84.

The band folding apparatus embodying the present invention further comprises a pair of inflatable first annular bags or bladders 144 and 144' and a pair of inflatable second annular bags or bladders 146 and 146'. When held in a collapsed condition, the second bladder 146 is wrapped partially around the first bladder carrying member 92 and partially around the second bladder carrying member 94 of the bladder support mechanism 84 and the first bladder 144 is wrapped partially around the first bladder carrying member 92 of the bladder support mechanism 84 and partially around the second bladder 146. Likewise, the second bladder 146' is wrapped partially around the first bladder carrying member 92 and partially around the second bladder carrying member 94 of the bladder support mechanism 84' and the first bladder 144' is wrapped partially around the first bladder carrying member 92 of the bladder support mechanism 84' and partially around the second bladder 146' when the bladders 144' and 146' are held in collapsed conditions. The first and second bladders 144 and 146 supported on the bladder carrying members 92 and 94 of the bladder support mechanism 84 have annular ribs or boss portions 148 and 150 formed with apertures 152 and 154, respectively. The annular rib or boss portion 148 of the first bladder 144 is received in the first circumferential groove 98 in the first bladder carrying member 92 of the bladder support mechanism 84 so that the aperture 152 formed in the rib or boss portion 148 is open to the aperture 102 in the carrying member 92. Likewise, the annular rib or boss portion 150 of the second bladder 146 are received in the second circumferential groove 100 so that the aperture 154 formed in the rib or boss portion 150 is open to the aperture 104 in the carrying member 92. Thus, the previously described first and second fluid inlet/outlet fittings 106 and 108 communicate with the interiors of the first and second bladders 144 and 146, respectively, on the bladder carrying members 92 and 94 of the bladder support mechanism 84. The first and second bladders 144' and 146' supported on the bladder carrying members 92 and 94 of the bladder support mechanism 84' also have annular ribs or boss portions 148' and 150' formed with apertures (not shown) and received in the first and second circumferential grooves 98 and 100, respectively, in the bladder carrying members 92 and 94 of the bladder support mechanism 84'. Though not shown in the drawings, these apertures formed in the annular ribs or boss portions 148' and 150' are open to the first and second fluid inlet/outlet fittings 106 and 108 which are attached to the bladder carrying members 92 and 94, respectively, of the bladder support mechanism 84' and which thus communicate with the interiors of the bladders 144' and 146', respectively.

When the first and second fluid inlet/outlet fittings 106 and 108 are isolated from the source of the fluid under pressure and are open to the atmosphere, both of the first and second bladders 144 and 146 are maintained collapsed as shown in FIG. 3. Under these conditions, the first bladder 144 has a folded-over inner axial end portion 144a surrounded by the axially protruding end portions of the deck segments 76 along one axial end of the drum structure 10 and thus axially protruding into one of the previously mentioned annular zones Z of the drum structure 10. In the band folding apparatus embodying the present invention, the first bladder 144 is prepared in such a manner that the particular axial end portion 144a of the bladder 144 has a resistance to elongation less than that of an opposite, viz., folded-over outer axial end portion 144b of the bladder 144. Similarly, the first bladder 144' on the bladder carrying members 92 and 94 of the bladder support mechanism 84' has a folded-over inner axial end portion surrounded by the axially protruding end portions of each of the deck segments 76 along the other axial end of the drum structure 10 and thus axially protruding into one of the previously mentioned annular zones Z of the drum structure 10 is prepared in such a manner as to have its folded-over inner axial end portion surrounded by the other axially protruding end portions of the deck segments 76 and formed to have a resistance to elongation less than that of the folded-over outer axial end portion of the bladder 144'. When the first fluid inlet/outlet fitting 106 communicates with the pressurized fluid source, fluid under pressure is directed into the first bladder 144 though the first fluid inlet/outlet fitting 106 so that the bladder 144 is inflated to an expanded state. Because, in this instance, of the fact that the folded-over inner axial end portion 144a of the bladder 144 has a less resistance elongation than the folded-over outer axial end portion 144b of the bladder 144 as above described, the axial end portion 144a expands at a higher rate than the axial end portion 144b and is for this reason permitted to slide on the deck segments 76 axially of the deck segments 76 after the axial end portion 144a has been brought into pressing contact with the axially protruding opposite end portions of the deck segments 76.

The band folding apparatus embodying the present invention further comprises detecting means operative to detect predetermined medium expanded states of the first bladders 144 and 144'. The detecting means includes a pair of limit switches 156 and 156' located above the bladders 144 and 144', respectively, and are arranged to be actuated when the bladders 144 and 144' are inflated to a predetermined medium expanded states.

Description will be hereinafter made regarding the operation of the band folding apparatus constructed and arranged as hereinbefore described. At an initial stage of the operation, the fluid distributor valve means provided in the conduits leading to the main power cylinder unit 44 from the associated pressurized fluid source is held in a condition providing communication between the fluid source and the first fluid chamber 54 of the cylinder unit 44 and permitting the second fluid chamber 54' of the cylinder unit 44 to be open to the atmosphere. In the presence of fluid under pressure in the first fluid chamber 54, the cylinder body 48 of the main power cylinder unit 44 is held in the axial position engaged by the stop member 58 on the drum shaft 12 so that the link members 62 and 62' of the individual drum hub assemblies 30 are held in positions extending substantially at right angles to the center axis of the drum shaft 12 as shown in FIG. 3. The drum structure 10 as a whole is thus maintained in the fully expanded condition thereof about the center axis of the drum shaft 12. The drive means for the drum shaft 12 is then actuated to drive the drum shaft 12 for rotation so that the drum hub assemblies 30, drum deck assemblies 68, and bladder support mechanisms 84 and 84' are caused to turn at a predetermined speed about the center axis of the drum shaft 12. While the drum deck assemblies 68 are being rotated about the center axis of the drum shaft 12, a strip of rubberized fabric is wrapped around the deck segments 76 with opposite end portions of the strip overlapped by each other. The overlapped end portions of the strip are then bonded or stitched together so as to form on the deck segments 76 an annular or cylindrical resilient breaker band B of rubberized fabric to form part of a tire carcass as indicated in part by phantom lines. Under these conditions, the breaker band B has its opposite axial end portions projecting beyond the opposite axial ends, respectively, of the deck segments 76 and received on the outer peripheral surfaces of the first bladders 144 and 144' as will be seen from FIG. 3. While, thus, it is herein assumed that the band folding apparatus embodying the present invention is used for the folding of a single breaker ply or band of rubberized fabric, it should be borne in mind that a band folding apparatus according to the present invention is operable for folding any other annular flexible band or an assembly of a plurality of resilient plies superposed on each other.

Figure 4:
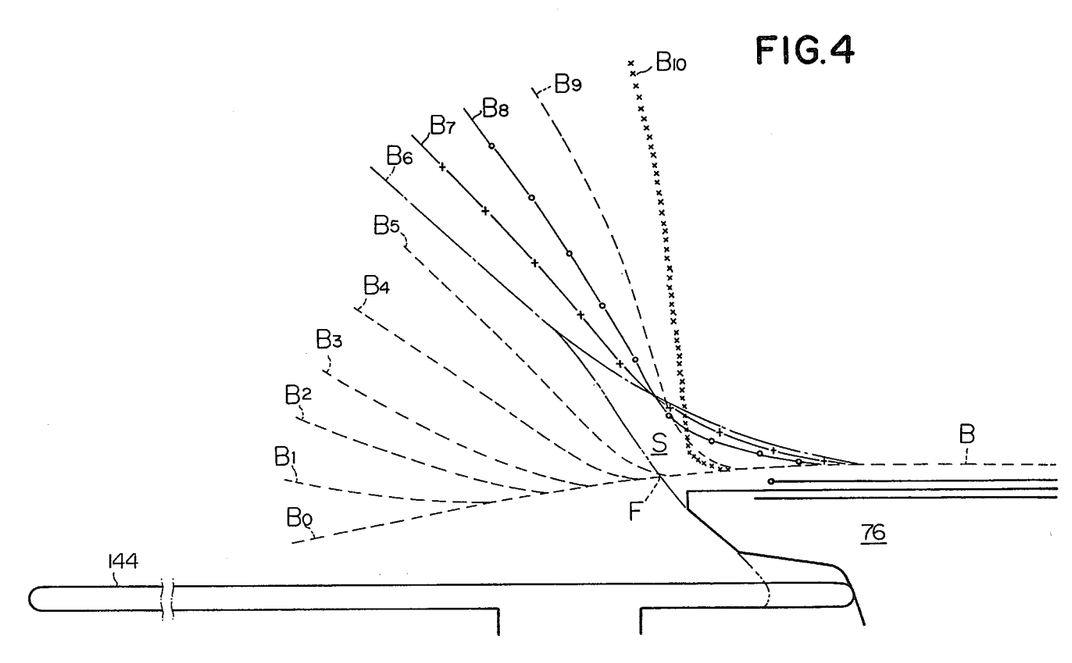
FIG. 4 is a schematic view showing various successive stages of deformation of a breaker band B being folded in the band folding apparatus shown in FIG. 3.

The fluid distributor valve means provided in the conduit leading to the first fluid inlet/outlet fitting 106 of each of the bladder support mechanisms 84 and 84' from the associated pressurized power source is now made open so that communication is provided between the fluid source and the fluid inlet/outlet fitting 106. Fluid under pressure is thus directed into each of the first bladders 144 and 144' by way of the fluid inlet/outlet fitting 106 and the first aperture 102 in the first bladder carrying member 92 and further through the aperture 152 in the rib or boss portion 148 of each of the bladders 144 and 144'. As a consequence, the first bladders 144 and 144' are inflated from the initial collapsed states thereof. As the bladders 144 and 144' are thus expanded, each of the axial end portions of the breaker band B is caused to turn away from the bladder carrying member 92 continuously from its initial position indicated by $B_0$ to a position indicated by $B_5$ through positions indicated by $B_1$, $B_2$, $B_3$ and $B_4$ about a circumferential line F adjacent each axial end of the cylindrical set of deck segments 76, as shown in FIG. 4. The circumferential line F is the line about which each of the turned axial end portions of the breaker band B is to be folded back onto the outer peripheral surface of the remaining or axially intermediate portion of the breaker band B. When each of the bladders 144 and 144' is inflated to the previously mentioned medium expanded state thereof, the folded-over inner axial end portion 144a of the bladder reaches the position $B_5$ and the bladders 144 and 144' are brought into pressing contact with the limit switches 156 and 156', respectively, at the radially outer ends of the bladders 144 and 144'. At the moment when the limit switches 156 and 156' are thus pressed by the bladders 144 and 144', respectively, the fluid distributor valve means provided in the conduits leading to the fluid inlet/outlet fittings 106 of the bladder support mechanisms 84 and 84' are operated to block the communication between the pressurized fluid source and the fluid inlet/outlet fittings 106.

The fluid distributor valve means provided in the conduits leading to the auxiliary power cylinder unit 114 of each of the bladder support mechanisms 84 and 84' from the associated pressurized fluid source is then operated to provide communication between the fluid source and the first fluid chamber 122 of the cylinder unit 114 and to permit the second fluid chamber 122' of the cylinder unit 114 to be open to the atmosphere. Fluid under pressure is thus directed through the fluid inlet/outlet fitting 128 and the fluid passageway 126 into the fluid chamber 122 and causes the cylinder body 116 to axially move on the sleeve 110 away from the drum hub assemblies 30, thereby driving the first and second bladder carrying members 92 and 94 of each of bladder support mechanism 84 and 84' to move axially away from the drum deck assemblies 68 under the guidance of the guide rod 142. Each of the first bladders 144 and 144' on the bladder carrying members 92 and 94 of the bladder support mechanisms 84 and 84' is accordingly spaced wider apart from the drum deck assemblies 68 and forms an annular free space between each of the bladders 144 and 144' and the breaker band B on the deck segments 76 as indicated at S in FIG. 4. The result is that each of the axial end portions of the breaker band B which have been turned into the positions indicated by $B_5$ in FIG. 4 assumes a position indicated by $B_6$ with respect to each of the bladders 144 and 144'. The turned axial end portions of the breaker band B being thus displaced with respect to the first bladders 144 and 144', respectively, the wrinkles which have been produced along the circumferential fold line F are smoothed out and accordingly the stresses which have been produced in the end portion of the breaker band B are almost eliminated.

After the first bladders 144 and 144' are axially moved away from the drum deck assemblies 68 as above described, the fluid distributor valve means provided in the conduit leading to the second fluid inlet/outlet fitting 108 of each of the bladder support mechanisms 84 and 84' from the associated pressurized fluid source is made open so that communication is provided between the fluid source and the fluid inlet/outlet fitting 108. Fluid under pressure is thus directed into each of the second bladders 146 and 146' by way of the fluid inlet/outlet fitting 108 and the second aperture 104 in the first bladder carrying member 92 and further through the aperture 154 in the rib or boss portion 150 of each of the second bladders 146 and 146'. As a consequence, the second bladders 146 and 146' are inflated from the initial collapsed states thereof. As the bladders 146 and 146' are thus expanded, the first bladders 144 and 144' are forced to deform axially between the breaker band B and the second bladders 146 and 146', respectively, and cause each of the axial end portions of the breaker band B to further turn away from the bladder carrying member 92 continuously from the position $B_6$ to a position indicated by $B_{10}$ through positions indicated by $B_7$, $B_8$ and $B_9$ about the circumferential fold line F as shown in FIG. 4. As the second bladders 146 and 146' is further expanded, the first bladders 144 and 144' project beyond the opposite axial ends of the deck segments 76 and cause each of the turned axial end portions of the breaker band B to be turned toward the outer peripheral surface of the axially intermediate portion of the breaker band B, though not shown in the drawings. Each of the axial end portions of the breaker band B are in these manners completely folded against the outer peripheral surface of the intermediate portion of the breaker band B. After the breaker band B has thus been folded, the fluid distributor valve means provided in the conduits leading to the first and second fluid inlet/outlet fittings 106 and 108 of the bladder support mechanisms 84 and 84' from the associated pressurized fluid source are operated to block the communication between the pressurized fluid source and the fluid inlet/outlet fittings 106 and 108. The fluid under pressure in each of the bladders 144, 144', 146 and 146' is now released therefrom so that all the bladders 144, 144', 146 and 146' are collapsed. Concurrently as or after the bladders 144, 144', 146 and 146' are thus collapsed, the valve means leading from the pressurized fluid source to the main power cylinder unit 44 is operated to permit the first fluid chamber 54 to be open to the atmosphere and to provide communication between the fluid source and the second fluid chamber 54' of the cylinder unit 44. Fluid under pressure is now directed into the second fluid chamber 54' of the main power cylinder unit 44 and causes the cylinder body 48 to axially move on the drum shaft 12 away from the stop member 58. As a consequence, the link members 62 and 62' of the individual drum hub assemblies 30 are caused to turn in clockwise in FIG. 3 about the center axes of the pivot pins 64 and 64' on the cylinder body 48 and further about the center axes of the pivot pins 66 and 66' on the hub segments 32 and thereby drive the hub segments 32 to move radially toward the intermediate axial portion of the drum shaft 12 with the leg portions 36 and 36' thereof being guided through the radial grooves 28 and 28' in the guide plates 20 and 20', respectively. The drum structure 10 being thus radially contracted, the breaker band B folded on the deck segments 76 is ready to be removed therefrom.

While it has been described that the first bladders 144 and 144' are held compressed when the breaker band B is wrapped around the drum structure 10 at an initial stage of operation, the bladders 144 and 144' may be inflated slightly, viz., to an expanded state minor to the previously mentioned medium expanded state thereof before the breaker band B is wound on the drum 10. In this instance, the breaker band B wrapped around the drum structure 10 has its opposite axial end portions positioned on a cylindrical plane approximately aligned with the cylindrical external contour of the drum structure 10. While, furthermore, it has been described that the first bladders 144 and 144' are axially moved away from the drum deck assemblies 68 after the bladders have been inflated to the medium expanded states, such movement of the bladders 144 and 144' may be effected while the bladders 144 and 144' are being inflated.

What is claimed is:

1. A method of folding an annular resilient band about a circumferential fold line, comprising the steps of:

wrapping the annular band on a generally cylindrical drum structure which has a center axis therethrough, a cylindrical external contour about the center axis and an annular zone radially inward of the cylindrical external contour the drum structure being radially collapsible about the center axis thereof, the band being wrapped on the drum structure with an inflatable annular first bladder positioned in such a manner as to have a folded-over axial end portion of the first bladder axially protruding into said annular zone and with an inflatable annular second bladder positioned radially inwardly of the first bladder and in such a manner that the first and second bladders have axial portions overlapping each other, the band wrapped on the drum structure having an axial end portion axially protruding from an axial end of the drum structure, inflating the first bladder to a predetermined medium expanded state so that said axial end portion of the band on the drum structure is contacted by the bladder and displaced radially outwardly, the first bladder being inflated to an expanded state minor to said medium expanded state so as to have its outer peripheral surface substantially aligned with said cylindrical external contour of the drum structure, the first bladder being moved away from the drum structure after the first bladder is inflated to said medium expanded state, moving the first bladder a predetermined distance axially away from the drum structure for forming an annular gap between the first bladder and said axial end portion of the band, and inflating the second bladder to a fully expanded state for deforming the first bladder axially between the band and the second bladder so that said axial end portion of the band is caused to further turn about said fold line until the axial end portion of the band is received on an adjacent axial portion of the band.

2. A method of folding an annular resilient band about a circumferential fold line, comprising the steps of:

wrapping the annular band on a generally cylindrical drum structure which has a center axis therethrough, a cylindrical external contour about the center axis and an annular zone radially inward of the cylindrical external contour, the drum structure being radially collapsible about the center axis thereof, the band being wrapped on the drum structure with an inflatable annular first bladder positioned in such a manner as to have a folded-over axial end portion of the first bladder axially protruding into said annular zone and with an inflatable annular second bladder positioned radially inwardly of the first bladder and in such a manner that the first and second bladders have axial portions overlapping each other, the band wrapped on the drum structure having an axial end portion axially protruding from an axial end of the drum structure, inflating the first bladder to a predetermined medium expanded state so that said axial end portion of the band on the drum structure is contacted by the bladder and displaced radially outwardly, the first bladder being inflated to an expanded state minor to said medium expanded state so as to have its outer peripheral surface substantially aligned with said cylindrical external contour of the drum structure, said first bladder being moved away from the drum structure while the first bladder is being inflated to said medium expanded state, moving the first bladder a predetermined distance axially away from the drum structure for forming an annular gap between the first bladder and said axial end portion of the band, and inflating the second bladder to a fully expanded state for deforming the first bladder axially between the band and the second bladder so that said axial end portion of the band is caused to further turn about said fold line until the axial end portion of the band is received on an adjacent axial portion of the band.

* * * * *